(12) United States Patent
Watson et al.

(10) Patent No.: US 11,513,035 B2
(45) Date of Patent: Nov. 29, 2022

(54) DETECTION OF TRANSIENT EVENTS

(71) Applicant: Rolls-Royce plc, London (GB)

(72) Inventors: Graham Watson, Derby (GB); Steven D Massie, Derby (GB)

(73) Assignee: ROLLS-ROYCE plc, London (GB)

( * ) Notice: Subject to any disclaimer, the term of this patent is extended or adjusted under 35 U.S.C. 154(b) by 93 days.

(21) Appl. No.: 17/197,618

(22) Filed: Mar. 10, 2021

(65) Prior Publication Data

US 2021/0293663 A1 Sep. 23, 2021

(30) Foreign Application Priority Data

Mar. 17, 2020 (GB) ...................................... 2003828

(51) Int. Cl.
| | |
|---|---|
| G01M 15/14 | (2006.01) |
| F02C 3/04 | (2006.01) |
| G01H 1/00 | (2006.01) |
| G01M 5/00 | (2006.01) |
| G01M 7/00 | (2006.01) |
| G01N 29/14 | (2006.01) |
| G01N 29/42 | (2006.01) |
| G01N 29/46 | (2006.01) |

(52) U.S. Cl.
CPC .............. *G01M 15/14* (2013.01); *F02C 3/04* (2013.01); *G01H 1/003* (2013.01); *G01M 5/0033* (2013.01); *G01M 5/0066* (2013.01); *G01M 7/00* (2013.01); *G01N 29/14* (2013.01); *G01N 29/42* (2013.01); *G01N 29/46* (2013.01); *F05D 2220/32* (2013.01); *F05D 2270/334* (2013.01); *G01N 2291/0258* (2013.01)

(58) Field of Classification Search
CPC ...... F01D 21/003; F02C 3/04; F05D 2220/32; F05D 2270/334; G01N 2291/0258; G01N 29/14; G01N 29/42; G01N 29/46; G01H 1/003; G01M 5/0033; G01M 5/0066; G01M 7/00; G01M 15/14
See application file for complete search history.

(56) References Cited

U.S. PATENT DOCUMENTS

| | | | |
|---|---|---|---|
| 6,499,350 B1 * | 12/2002 | Board ..................... | G01H 1/006 73/660 |
| 2007/0095142 A1 * | 5/2007 | Samson ................. | G01N 29/46 73/660 |

OTHER PUBLICATIONS

Jul. 16, 2021 extended Search Report issued in European Patent Application No. 21157531.1.

\* cited by examiner

*Primary Examiner* — Loren C Edwards
(74) *Attorney, Agent, or Firm* — Oliff PLC

(57) ABSTRACT

An apparatus for detecting a transient event in an operating machine, the apparatus comprising: a controller configured to control performance of the following steps: a measurement step comprising measuring a periodic signal from a machine; a processing step comprising synchronously processing the periodic signal to track the primary frequency; a filtering step comprising removing the primary periodic component and its harmonics from the periodic signal to yield a filtered dataset; an integration step comprising integrating the filtered dataset over the remaining frequencies to yield an integrated dataset representing the periodic energy at frequencies other than the primary frequency and its harmonics; an analysis step comprising identifying a short-term transient in the integrated dataset to identify a transient disruption in the operation of the machine.

11 Claims, 4 Drawing Sheets

DETECTION OF TRANSIENT EVENTS

CROSS-REFERENCE TO RELATED APPLICATIONS

This application claims priority pursuant to 35 U.S.C. 119(a) of United Kingdom Patent Application No. 2003828.7, filed Mar. 17, 2020, which application is incorporated herein by reference in its entirety.

TECHNOLOGICAL FIELD

The present disclosure concerns methods and apparatus for detecting transient events in rotating or reciprocating machinery. They are particularly suited for use in gas turbine engines.

BACKGROUND

Gas turbine engines may be damaged in operation by impacts from foreign objects. The fan is particularly susceptible to foreign object damage (FOD) because it is at the front of the engine.

In-service detection of FOD is currently carried out by looking for the after-effects of any physical damage incurred. For example, vibration sensing can reveal a loss of mass or an out-of-balance condition in the fan system. Modern engine monitoring systems (EMUs) examine these vibration signals together with the high frequency content of the PS160 and PS26 signals indicative of aerofoil damage. These pressure measurements essentially give an indication of the performance of the compressor, and damage to the fan (or consequent damage to the compressor downstream of it) will result in a decrease in compressor efficiency. Finally, overall changes in the efficiency and capacity of the turbomachinery can also be observed, subjectively or quantitatively; for example, in the engine's response to throttle inputs or the amount of thrust required to achieve a particular manoeuvre.

A disadvantage of current techniques is that they are responsive to the effects of a FOD event and not to the event itself. Therefore, relying on such techniques might not identify impacts where little damage is incurred immediately but which might lead to increased damage, or even ultimately to catastrophic failure, with continued operation. To identify such impacts requires a degree of detection sensitivity that is not achievable with known techniques. Notably, pressure sensing tends to be better suited to steady-state operation; pressure transducers are often located remotely from the point of measurement, for reasons of temperature capability, and connected by several metres of piping which suppresses dynamic responses.

BRIEF SUMMARY

According to aspects of this disclosure there is provided an apparatus and a method.

According to a first aspect there is provided an apparatus for detecting a transient event in an operating machine, the apparatus comprising: at least one processor; at least one memory comprising computer readable instructions; the at least one processor being configured to read the computer readable instructions to cause performance of: a measurement step comprising measuring a periodic signal from a machine; a processing step comprising synchronously processing the periodic signal to track the primary frequency; a filtering step comprising removing the primary periodic component and its harmonics from the periodic signal to yield a filtered dataset; an integration step comprising integrating the filtered dataset over the remaining frequencies to yield an integrated dataset representing the periodic energy at frequencies other than the primary frequency and its harmonics; an analysis step comprising identifying a short-term transient in the integrated dataset to identify a transient disruption in the operation of the machine.

According to a second aspect there is provided an apparatus for detecting a transient event in an operating machine, the apparatus comprising: a controller configured to control performance of the following steps: a measurement step comprising measuring a periodic signal from a machine; a processing step comprising synchronously processing the periodic signal to track the primary frequency; a filtering step comprising removing the primary periodic component and its harmonics from the periodic signal to yield a filtered dataset; an integration step comprising integrating the filtered dataset over the remaining frequencies to yield an integrated dataset representing the periodic energy at frequencies other than the primary frequency and its harmonics; an analysis step comprising identifying a short-term transient in the integrated dataset to identify a transient disruption in the operation of the machine.

According to a third aspect there is provided an apparatus for detecting a transient event in an operating machine, the apparatus comprising control circuitry to control performance of the following steps: a measurement step comprising measuring a periodic signal from a machine; a processing step comprising synchronously processing the periodic signal to track the primary frequency; a filtering step comprising removing the primary periodic component and its harmonics from the periodic signal to yield a filtered dataset; an integration step comprising integrating the filtered dataset over the remaining frequencies to yield an integrated dataset representing the periodic energy at frequencies other than the primary frequency and its harmonics; an analysis step comprising identifying a short-term transient in the integrated dataset to identify a transient disruption in the operation of the machine.

According to a fourth aspect there is provided an apparatus for detecting a transient event in an operating machine, the apparatus comprising: processor circuitry; at least one memory comprising computer readable instructions; the processor circuitry being configured to read the computer readable instructions to cause performance of: a measurement step comprising measuring a periodic signal from a machine; a processing step comprising synchronously processing the periodic signal to track the primary frequency; a filtering step comprising removing the primary periodic component and its harmonics from the periodic signal to yield a filtered dataset; an integration step comprising integrating the filtered dataset over the remaining frequencies to yield an integrated dataset representing the periodic energy at frequencies other than the primary frequency and its harmonics; an analysis step comprising identifying a short-term transient in the integrated dataset to identify a transient disruption in the operation of the machine.

The operating machine may be a gas turbine engine.

The operating machine may be a fan system of a gas turbine engine.

The transient disruption may be a FOD event.

According to a fifth aspect there is provided a method for detecting a transient event in an operating machine, the method comprising: controlling an input device to measure a periodic signal from a machine; controlling a phase-locked loop to synchronously process the periodic signal to track the primary frequency; controlling a harmonic filter bank to remove the primary periodic component and its harmonics from the periodic signal to yield a filtered dataset; controlling an integrator to integrate the filtered dataset over the remaining frequencies to yield an integrated dataset representing the periodic energy at frequencies other than the primary frequency and its harmonics; controlling a comparator to identify a short-term transient in the integrated dataset to identify a transient disruption in the operation of the machine; controlling an output device to convey information about the transient to a user.

The operating machine may be a gas turbine engine.

The operating machine may be a fan system of a gas turbine engine.

The transient disruption may be a FOD event.

According to a sixth aspect there is provided a computer program that, when read by a computer, causes performance of the method as described in the preceding paragraphs.

According to a seventh aspect there is provided a non-transitory computer readable storage medium comprising computer readable instructions that, when read by a computer, cause performance of the method as described in the preceding paragraphs.

According to an eighth aspect there is provided a signal comprising computer readable instructions that, when read by a computer, cause performance of the method as described in the preceding paragraphs.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
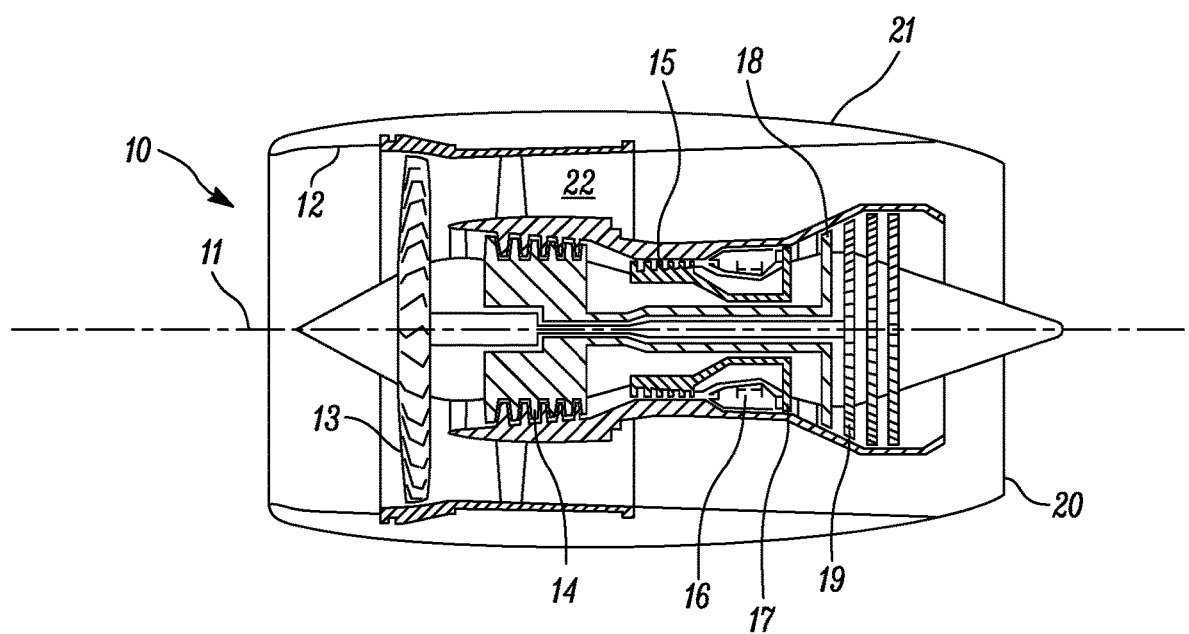
FIG. 1 is a cross sectional side view of a gas turbine engine according to various examples.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Gas turbine engines are typically controlled by electronic engine controllers (EECs) or engine management units (EMUs), which collect data from various sensors on the engine (detecting, inter alia, rotational speeds, pressures and temperatures) and combine these data with pilot inputs to modulate the control parameters to the engine.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

As explained above, known methods for identifying FOD rely on detecting the after-effects of the impact (for example, out-of-balance) which makes such methods relatively slow and insensitive.

Figure 2:
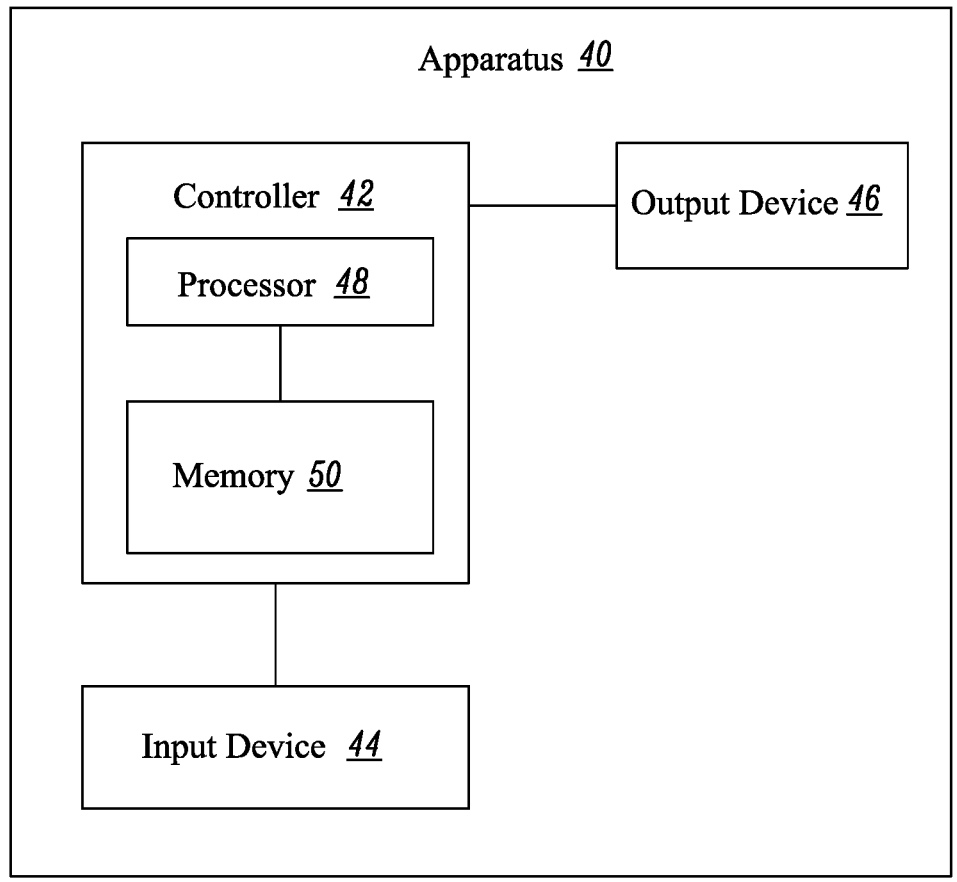
FIG. 2 is a schematic diagram of an apparatus according to various examples.

FIG. 2 is a schematic diagram of an apparatus 40. The apparatus 40 includes a controller 42, an input device 44, and an output device 46. In some examples, the apparatus 40 may be a module. As used herein, the wording 'module' refers to a device or apparatus where one or more features are included at a later time and, possibly, by another manufacturer or by an end user. For example, where the apparatus 40 is a module, the apparatus 40 may only include the controller 42, and the remaining features may be added by another manufacturer, or by an end user.

In an example embodiment, the apparatus 40 is incorporated in a gas turbine engine (10 in FIG. 1). The controller 42 may comprise an EMU or may be comprised within an EMU; alternatively, the controller 42 may comprise or may be comprised within a separate, dedicated, component. The input device 44 may comprise a shaft tachometer; alternatively, the input device 44 may comprise one or more microphones. If the input device 44 comprises more than one microphone, they may be in different positions in the engine and may be arranged to detect general or specific signals. The output device 46 may comprise that part of an EMU that handles data storage and transmission.

The controller 42, the input device 44, and the output device 46 may be coupled to one another via a wireless link and may consequently comprise transceiver circuitry and one or more antennas. Additionally or alternatively, the controller 42, the input device 44 and the output device 46 may be coupled to one another via a wired link and may consequently comprise interface circuitry (such as a Universal Serial Bus (USB) socket). It should be appreciated that the controller 42, the input device 44, and the output device 46 may be coupled to one another via any combination of wired and wireless links.

Figure 3:
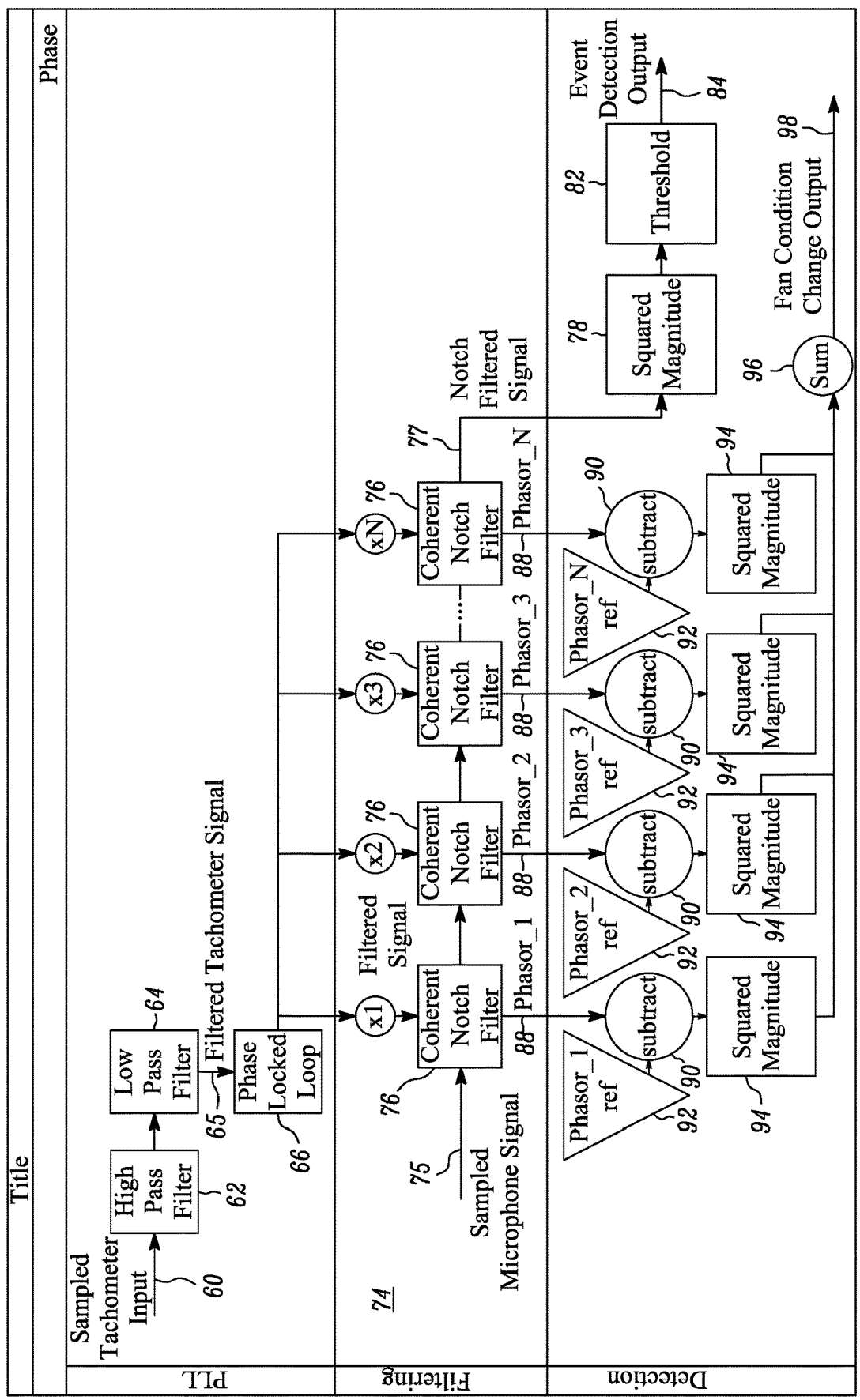
FIG. 3 is a flow diagram of a method according to various examples.

The controller 42 comprises suitable circuitry to cause performance of the methods described herein and as illustrated in FIG. 3 (which will be described in due course). The controller 42 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods. The controller 42 may comprise dedicated signal conditioning circuitry (e.g. amplification and filtering); the controller 42 may comprise digital signal processing circuitry to implement the methods across multiple signals in real time. The controller 42 may comprise general-purpose processing circuitry for data handling and interpretation.

The controller 42 may comprise at least one processor 48 and at least one memory 50. The memory stores a computer program comprising computer readable instructions that, when read by the processor 48, causes performance of the methods described herein, and as illustrated in FIG. 3. The computer program may be software or firmware, or may be a combination of software and firmware.

The processor 48 may be located on the gas turbine engine (10 in FIG. 1), or may be located remote from the gas turbine engine 10, or may be distributed between the gas turbine engine 10 and a location remote from the gas turbine engine 10. The processor 48 may comprise an EMU or may be comprised within an EMU; alternatively, the controller 48 may comprise or may be comprised within a separate, dedicated, processor. The processor 48 may include at least one microprocessor and may comprise a single core processor, may comprise multiple processor cores (such as a dual core processor or a quad core processor), or may comprise a plurality of processors (at least one of which may comprise multiple processor cores).

The memory 50 may be located on the gas turbine engine 10, or may be located remote from the gas turbine engine 10, or may be distributed between the gas turbine engine 10 and a location remote from the gas turbine engine 10. The memory 50 may comprise an EMU or may be comprised within an EMU; alternatively, the memory 50 may comprise or be comprised within a separate entity. The memory may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive or a secure digital card). The memory may include: local memory employed during actual execution of the computer program; bulk storage; and cache memories which provide temporary storage of at least some computer readable or computer usable program code to reduce the number of times code may be retrieved from bulk storage during execution of the code.

The computer program may be stored on a non-transitory computer readable storage medium (not shown in FIG. 2). The computer program may be stored within an EMU, for example as part of the EMU firmware. The computer program may be transferred from the non-transitory computer readable storage medium to the memory 50. The non-transitory computer readable storage medium may be, for example, a USB flash drive, a secure digital (SD) card, an optical disc (such as a compact disc (CD), a digital versatile disc (DVD) or a Blu-ray disc). In some examples, the computer program may be transferred to the memory 50 via a wireless signal or via a wired signal.

The user input device may comprise any suitable device for enabling an operator to at least partially control the apparatus 40. For example, the user input device may comprise one or more of a keyboard, a keypad, a touchpad, a touchscreen display, and a computer mouse. The controller 42 is configured to receive signals from the user input device.

The output device 46 may be any suitable device for conveying information to a user. For example, the output device 46 may comprise that part of an EMU that handles data storage and transmission. Alternatively, the output device 46 may be a display (such as a liquid crystal display, or a light emitting diode display, or an active matrix organic light emitting diode display, or a thin film transistor display, or a cathode ray tube display), and/or a loudspeaker, and/or a printer (such as an inkjet printer or a laser printer). The controller 42 is arranged to provide a signal to the output device to cause the output device 46 to convey information to the user.

It is envisaged that the method illustrated in FIG. 3 will be performed in 'real-time', that is, substantially at the same time that the data is measured. In this case, the controller 42 may be coupled to the gas turbine engine 10 and may comprise an electronic engine controller or another on-board processor. Where the gas turbine engine 10 powers an aircraft, the controller 42 may be an engine controller, a processor on-board the gas turbine engine 10, or a processor on-board the aircraft. Alternatively, the method illustrated in FIG. 3 may be performed 'offline' on data which has been previously measured and recorded.

FIG. 3 illustrates a flow diagram of a method according to various examples.

An input signal 60 is a sampled tachometer input, representing raw shaft speed data. Where the method is applied in a gas turbine engine as shown in FIG. 1, data may be captured from any one or more of the low pressure, intermediate pressure and high pressure shafts. Using the raw shaft speed data as the input to the processing allows access to the full set of frequency components present and, critically, to the phase information associated with them. Known methods of processing based on the signal spectrogram alone do not have this phase content and will therefore be less sensitive and discriminating. The shaft speed data may be generated using a phonic wheel or by any other suitable method and may include once-per-revolution indexing.

The input signal 60 passes through high-pass 62 and low-pass 64 filters. The high-pass filter removes low-frequency noise from the signal; the low-pass filter removes high-frequency content from the signal, which might otherwise corrupt the parts of the signal that are of interest; it therefore acts as an anti-aliasing filter. In an example the threshold of the high-pass filter is 50 Hz and the threshold of the low-pass filter is 2800 Hz.

The filtered tachometer signal 65 is fed into a phase-locked loop 66, which comprises a phase comparator, a low-pass loop filter, and an oscillator (which are not shown in FIG. 3). The phase-locked loop 66 operates in conventional manner and need not be further described here. The output from the phase-locked loop 66 is the primary periodic component of the signal. Because the processing is synchronous (or frequency-locked) with the primary rotational frequency, this component of the signal and its harmonics may be removed or nulled out from the data, giving cleaner access to the sub-band frequency components from where information concerning short-term transients may be derived.

The primary periodic component is next fed into a harmonic filter bank 74 comprising a plurality of notch frequency filters 76. The harmonic filter bank 74 operates in conventional manner by taking the primary frequency component and its integer multiples (i.e. its harmonics) and tuning filters to these frequencies to remove them from the input signal. The number of filters depends on the signal bandwidth, which is determined by the anti-aliasing filter described previously. In this way all the harmonics are generated right the way up to the highest one that can be present.

If the input device comprises one or more microphones, as described above, the sampled signals from the microphone or microphones will comprise a further input signal 75 to the harmonic filter bank 74.

The harmonic filter bank 74 delivers as its output a notch filtered signal 77, the magnitude of which is squared 78 so that it is correlated to the signal energy. The signal is then fed through an integrator and subjected to an integration step (not shown in FIG. 3) to sum the remaining frequency components, resulting in a measure that is proportional to the total residual energy in the signal.

This integrated signal provides a sensitive measure of rotational energy at frequencies other than the primary rotation frequency. Peaks in this integrated signal can be detected; these are highly indicative of short transient disruptions to the fan system rotation, as would be generated by FOD events such as bird strikes. The integrated signal is compared 82 by a comparator against a threshold to detect such disruptions or events. The threshold will be determined by measuring the signal statistics, and set at a suitable level to give a desired sensitivity whilst avoiding false alarms.

The method therefore provides a sensitive means of detecting short-term transients in an input signal. This yields a high degree of sensitivity, but also gives very accurate temporal localisation—in other words, generates a rapid and short response which timestamps the transient event very accurately.

A detected event is then notified 84, for example to the crew if the apparatus is part of a gas turbine engine on an aircraft. The crew can take any appropriate immediate actions, and schedule a ground-based inspection of the engine as soon as possible to identify and assess any damage. In a further embodiment (not illustrated in the drawings), it is envisaged that a camera or cameras will be triggered by the detection of an event to capture one or more images of any damage on the fan. Suitable image analysis software will then be used to analyse the image or images and thereby to quantify the damage.

A further output from the notch frequency filters 76 is a set of corresponding phasors 88, identified as Phasor_1 to Phasor_N, Each of these phasors represents the phase angle of a corresponding frequency component. Changes in the values of the phasors 88, Phasor_1 to Phasor_N, are derived by a subtraction operation 90 with respective phasor reference values 92, $Phasor\_1_{ref}$ to $Phasor\_N_{ref}$. The magnitude of each change is squared 94 and the squared values summed 96 to yield a fan condition change output 98. The inventors have determined that changes in the phase angles of these frequency components can provide a robust and sensitive means to describe the signal, and in particular to identify small changes in the signal.

Figure 4B:
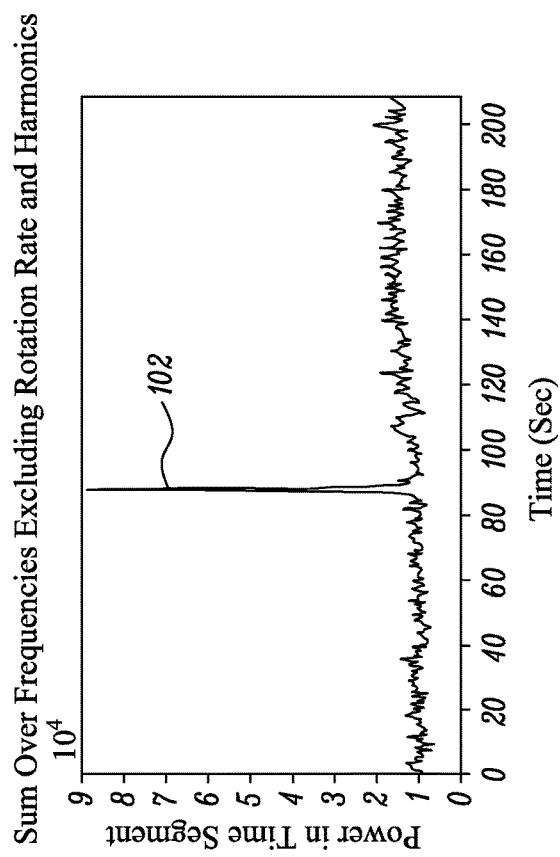
FIG. 4A illustrates a signal spectrogram with the primary rotational frequency and its harmonics nulled out; and, FIG. 4B illustrates the integrated signal power corresponding to the signal spectrogram of FIG. 4A.
Figure 4A:
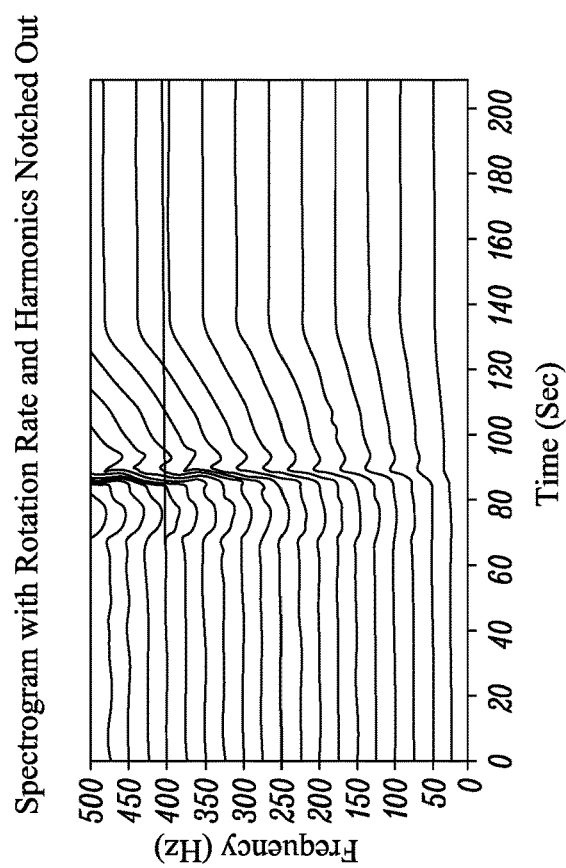

FIG. 4A illustrates a signal spectrogram with the primary rotational frequency and its harmonics nulled out. FIG. 4B illustrates the integrated signal power.

The dark bands in FIG. 4A are where primary rotational components have been removed (as explained in the description of FIG. 3) that would otherwise swamp the signal from any impact or other event. For each sampled instant in time (i.e. taking vertical 'slices' through FIG. 4A), the signal shown in FIG. 4A is squared and summed, yielding FIG. 4B. The spike 102 in FIG. 4B identifies an impact event, and the height of the spike 102 is a measure of the impact energy.

The inventors have discovered that monitoring the non-primary components in this way provides a good method for identifying and quantifying transient events. The inventors have further discovered that the set of primary rotational components can be monitored over a longer period, and changes in these primary rotational components are indicative of persistent damage to the fan. In effect, their "signature" changes after impact events.

It will be understood that the invention is not limited to the embodiments described, and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

What is claimed is:

1. An apparatus for detecting a transient event in an operating machine, the apparatus comprising:
   a controller configured to control performance of the following steps:
   a measurement step comprising measuring, with a tachometer, a periodic signal from the machine;
   a processing step comprising synchronously processing the periodic signal to track a primary frequency;
   a filtering step comprising removing a primary periodic component and harmonics of the primary periodic component from the periodic signal to yield a filtered dataset;
   an integration step comprising integrating the filtered dataset over remaining frequencies to yield an integrated dataset representing a periodic energy at frequencies other than the primary frequency and harmonics of the primary frequency;
   an analysis step comprising identifying a short-term transient in the integrated dataset to identify a transient disruption in an operation of the machine.

2. The apparatus as claimed in claim 1, wherein the operating machine is a gas turbine engine.

3. The apparatus as claimed in claim 2, wherein the transient disruption is a FOD event.

4. The apparatus as claimed in claim 1, wherein the operating machine is a fan system of a gas turbine engine.

5. The apparatus as claimed in claim 1, wherein the periodic signal is an input that represents raw shaft speed data.

6. A method for detecting a transient event in an operating machine, the method comprising:
   controlling a tachometer to measure a periodic signal from the machine;

controlling a phase-locked loop to synchronously process the periodic signal to track a primary frequency;

controlling a harmonic filter bank to remove a primary periodic component and harmonics of the primary periodic component from the periodic signal to yield a filtered dataset;

controlling an integrator to integrate the filtered dataset over remaining frequencies to yield an integrated dataset representing a periodic energy at frequencies other than the primary frequency and harmonics of the primary frequency;

controlling a comparator to identify a short-term transient in the integrated dataset to identify a transient disruption in an operation of the machine;

controlling an output device to convey information about the transient event to a user.

7. The method as claimed in claim 6, wherein the operating machine is a gas turbine engine.

8. The method as claimed in claim 7, wherein the transient disruption is a FOD event.

9. The method as claimed in claim 6, wherein the operating machine is a fan system of a gas turbine engine.

10. A non-transitory computer readable storage medium comprising computer readable instructions that, when read by a computer, cause performance of the method as claimed in claim 6.

11. The method as claimed in claim 6, wherein the periodic signal is an input that represents raw shaft speed data.

\* \* \* \* \*